May 28, 1946.   V. E. PRATT ET AL   2,401,185
CONTINUOUS FILM PROCESSING APPARATUS
Filed Feb. 1, 1943   2 Sheets-Sheet 1
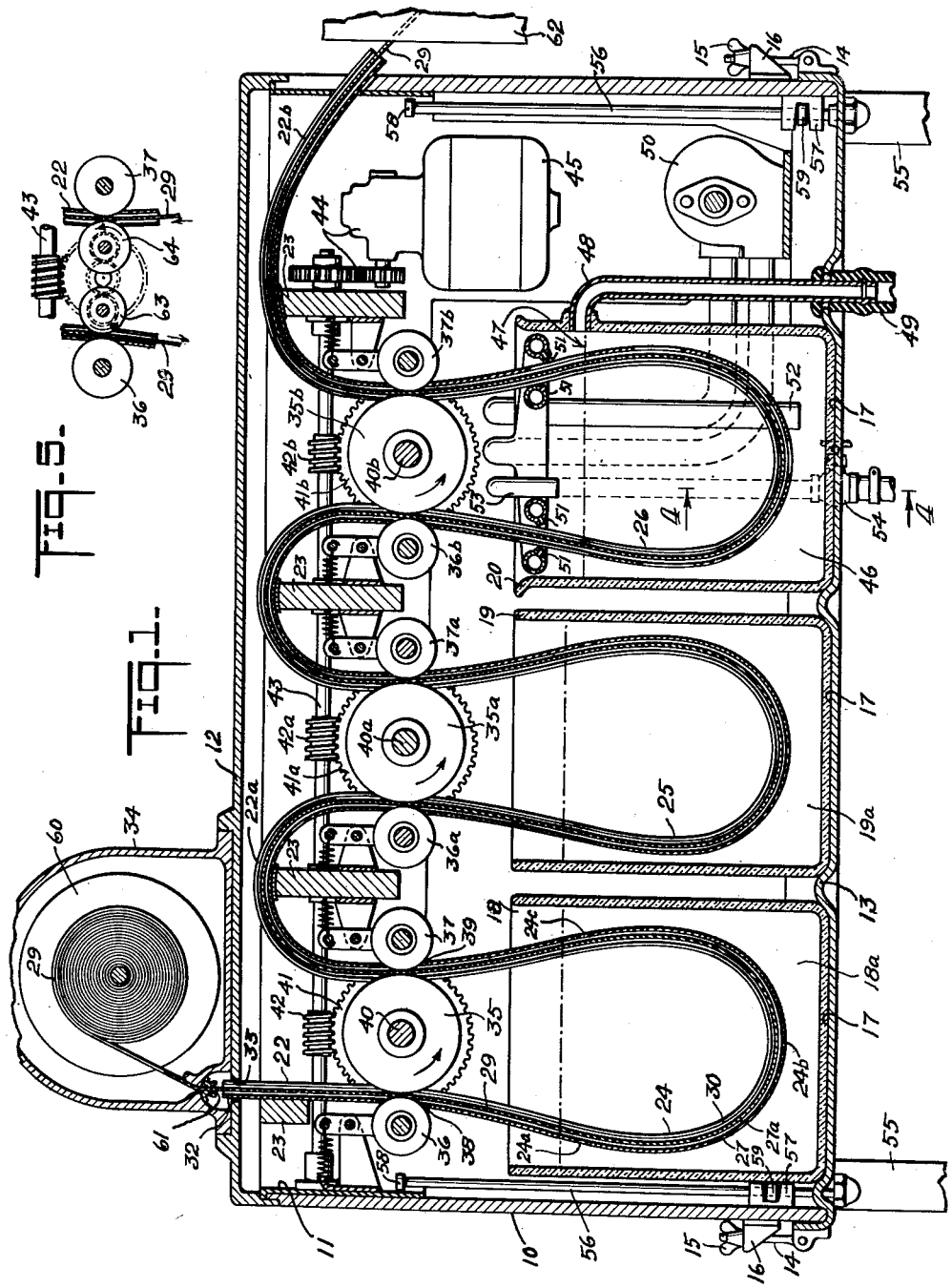
INVENTORS
Verneur E. Pratt.
BY Daniel E. Reed.
Van Deventer & Grier
ATTORNEYS

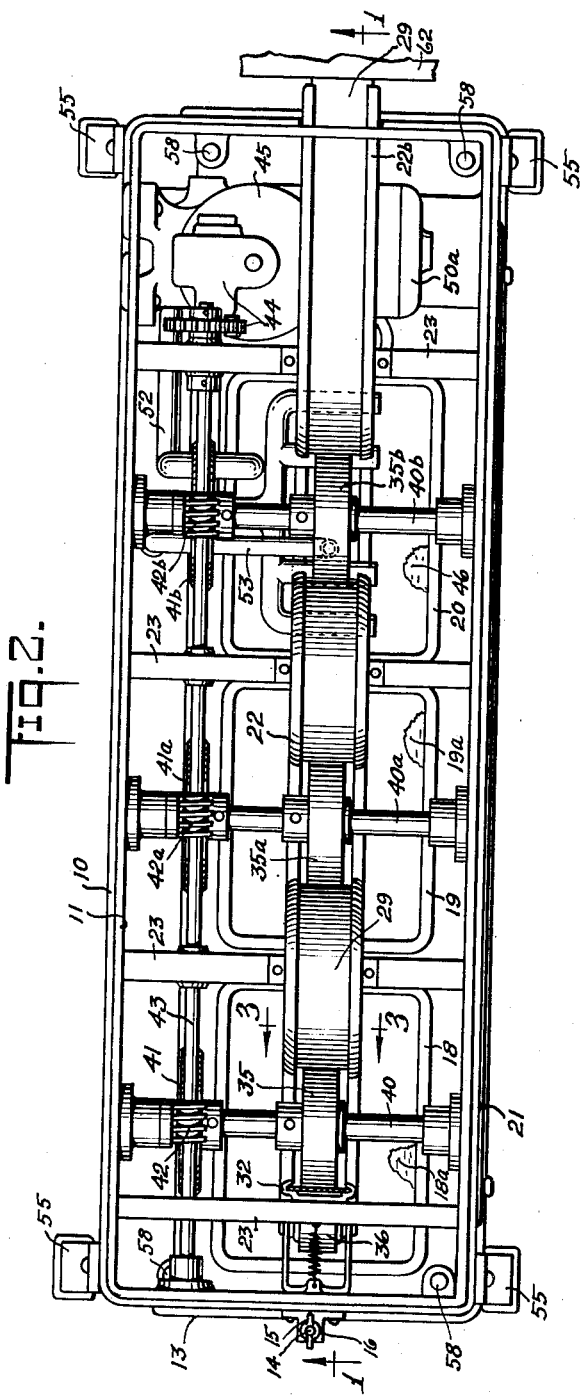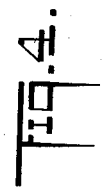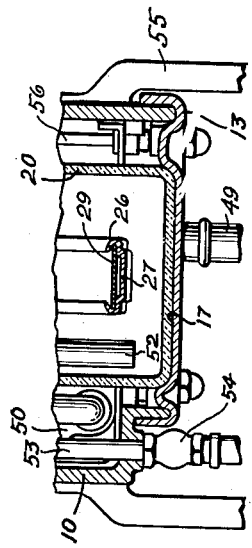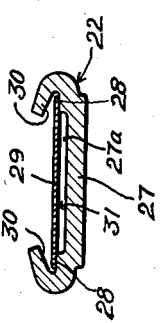
INVENTORS
*Verneur E. Pratt*
BY *Daniel E. Reed.*
ATTORNEYS Patented May 28, 1946

2,401,185

UNITED STATES PATENT OFFICE 2,401,185

CONTINUOUS FILM PROCESSING APPARATUS

Verneur E. Pratt and Daniel E. Reed, Norwalk, Conn.; said Reed assignor to said Pratt Application February 1, 1943, Serial No. 474,316

7 Claims. (Cl. 95—94)

The present invention pertains to improvements in continuous film processing apparatus.

An object of the invention is to provide improved means by which a film strip is positively controlled, guided and fed throughout the successive processing operations.

Another object is to provide means for changing and disposing the successive processing baths in operative position.

Another object is to provide apparatus of the above nature which is simple, compact, readily portable and easily operated without the use of a dark-room.

Other objects and advantages of the invention will become evident in the course of the following description in connection with the accompanying drawings, in which Figure 1 is a longitudinal sectional view of a preferred form of the apparatus;

Figure 2 is a plan view of the same with the cover removed;

Figure 3 is a detail cross sectional view of the film-guide and film;

Figure 4 is a detail cross sectional view approximately on the lines 4—4, Figure 1; and Figure 5 is a diagrammatic detail view of an alternative drive roller arrangement.

Referring to Figures 1 and 2, the numeral 10 denotes a casing in which is removably mounted a frame 11. The casing is provided with a suitable cover 12 and a bottom plate 13, both removable and both adapted to form light-tight seals with the casing 10 when in place.

The bottom plate 13 is detachably held to the casing 10 by any suitable means, such as hinged clamp bolts 14 having wing-nuts 15 engaging forked members 16 secured to the casing. Depressions 17 in the bottom plate 13 are adapted to receive and locate rectangular bath jars 18, 19 and 20.

The casing 10 is provided with suitable legs 55 to hold it sufficiently above table or other supporting surface to allow removal of the jars 18, 19 and 20 as hereinafter described. Four upwardly extending rods 56, secured to the bottom 13, are slidably disposed in cross-slotted guides 57 secured in the casing 10. Stop flanges 58 are provided on the upper ends of the rods 56.

When it is desired to remove any or all of the liquid jars, the wing-nuts 15 are loosed and swung clear of the members 16, then the bottom plate 13 is lowered until the stop flanges 58 engage the guides 57, thereby suspending the plate in a position sufficiently below the casing 10 to allow free access to the jars 18, 19 and 20, for removal and replacement thereof without disturbing the hereinafter described internal parts of the apparatus. Friction rings 59, engaging the rods 56 and retained in the guides 57, may be provided to retard the descent of the bottom plate and jars in case of careless handling.

When the jars have been replaced in proper position in the depressions 17, the bottom plate is raised and reclamped to the casing 10 in the position shown.

A side door 21 in the casing 10 (Figure 2), permits access to the interior for inspection or adjustment of the parts.

A film guide 22 is secured to the frame 11 by means of cross members 23. The guide 22 is formed with downward loops 24, 25 and 26 depending within the jars 18, 19 and 20, respectively, when the jars are in operative position as shown in Figure 1.

The guide 22 may be made of any suitable material, for example a cellulose plastic, which is impervious to the processing media.

Referring to the cross sectional view (Figure 3), it will be seen that the guide 22 has a depressed central web 27, narrow and substantially flat side rails 28 adapted to support the edge portions of the film 29, and inwardly directed angular lips 30 overlying the edges of the film. The film is disposed in the guide 22, preferably with the emulsion side 31 directed toward the rails 28. The narrowness of the rails causes the entire effective width of the emulsion surface to overlie the channel 27ª defined by the depressed web 27, thus promoting even and thorough exposure of the entire effective emulsion surface to the processing fluids as hereinafter set forth. The angular lips 30 are adapted to engage the extreme edges of the film in substantially line contact.

The entering end 32 of the guide 22 protrudes upward through a slot 33 in the cover 12 (Figure 1), and is adapted to register with a film magazine 34 hereinafter further described.

A resilient drive roller 35 engages the film 29 in both sides of the guide-loop 24, near the top thereof. Spring-pressed idler rollers 36 and 37 extend through openings 38 and 39 in the guide web 27 to hold the film 29 in proper contact with the drive roller 35, the second idler roller 37 and the drive roller also serving as squeegees in a manner to be presently described.

Perforations 24ª, 24ᵇ and 24ᶜ are provided in the web 27 at the left side, bottom, and right side, respectively, of the loop 24 to allow free entry and egress of fluid to and from the chamber 27ª.

Drive rollers 35, 35ᵃ and 35ᵇ are secured on cross shafts 40, 40ᵃ and 40ᵇ on which are mounted worm wheels 41, 41ᵃ and 41ᵇ, the worm wheels being adapted to be revolved at identical speeds by worms 42, 42ᵃ and 42ᵇ, on a longitudinal shaft 43. The shaft 43 is operatively connected via suitable reduction gearing 44 with a motor 45.

The jar 20, comprising the washing bath, is adapted to hold water 46 up to a level 47, this level being maintained by an overflow pipe 48 adapted to be connected to a suitable drain by means of a tube 49 or the like. A pump 50, driven by a second motor 50ᵃ, (Figure 2), directs streams of water via nozzles 51 against both sides of the film 29 above the level 47. A suction tube 52 leads from the lower part of the jar 20 to the pump 50.

The web 27 of the guide loop is cut away as shown in Figure 1, to permit the water to freely engage the back of the film. A water inlet 53, controllable by a valve 54 (Figures 1 and 4), is adapted to be connected to a suitable source of fresh water, thus allowing fresh water to be supplied at any desired rate.

A typical operation of the device is as follows:

The jar 18 is filled to the proper level with a suitable combined developer-fixer or "one-shot" solution 18ᵃ, for example of the type fully described in United States Letters Patent No. 2,138,486, dated November 29, 1938.

The jar 19 is similarly filled with a hardening solution 19ᵃ, water is admitted to the jar 20 through the inlet 53, and the pump 50 is started to provide circulation of the water bath. The motor 45 is also started to revolve the rollers 35, 35ᵃ and 35ᵇ at low speed through the previously described gearing.

The undeveloped film 29 is initially contained in the magazine 34 on a reel 60, the end of the film protruding through a light-shielded slot 61. It will be understood that the magazine 34 is detachable from the cover 12 and may form part of the photographing apparatus.

The operator first inserts a sufficient length of the film into the entering end 32 of the guide 22 to bring the end of the film into engagement with the first resilient feed roller 35 and the idler 36, after which the operator places the magazine 34 on the cover 12 in light-tight relationship therewith, as shown in Figure 1.

The leading end of the film 29, having been engaged between the slowly revolving resilient roller 35 and the idler 36, is thereby pushed downward, around the bottom curve and up the right side of the first guide loop 24, following the latter's curvature throughout without buckling, due to the marginal guiding action of the side rails 28 and the angular lips 30 and to the curvature itself which prevents any tendency to transverse buckling.

As the leading end of the film ascends the right side of the loop 24 it is re-engaged by the drive roller 35. The film is thus pushed through the first upper curve 22ᵃ of the guide 22 and downward into engagement with the second resilient feed roller 35ᵃ. The film is pushed through the second loop 25 and third loop 26 in the same manner as described, the rollers 35ᵃ and 35ᵇ engaging it in cooperation with their respective idler rollers.

Upon emerging from the loop 26, the film is pushed over and out through a final extension 22ᵇ of the guide 22, from which it may pass to any suitable dryer 62. As the particular structure of the dryer 62 per se does not form part of the present invention, and as such dryers are well known in the art, further description herein is unnecessary.

In its passage throughout the loop 24 the film 29 is acted upon by the processing fluid 18ᵃ in the jar 18. In the preferred process, as previously noted, this fluid is a combined fixer-developer, so that the film emerges therefrom developed and fixed. The feed roller 35 and idler 37 act as squeegees to direct the greater part of any adhering fluid back into the jar 18.

Similarly, in its passage through the second loop 25, the film 29 is acted upon by the hardening fluid 19ᵃ in the jar 19, while in the third loop 26 the film is washed by the water in the jar 19, the washing being accelerated and rendered thorough by the vigorous application of water from the pressure nozzle 51.

From the foregoing description it will be evident that the film is continuously pushed throughout the successive fluid baths. The actual traction is supplied by the initial engagement of the dry film by the roller 35, while the succeeding roller engagements tend to continue the motion and minimize any slight frictional resistance effect between the guide and film. The lubricating effect of the various fluids between the margins of the film and the guide also serves to reduce friction to a minimum.

In the preferred form, as shown in Figures 1 and 2 and as previously noted, the peripheral speed of all resilient drive rollers is the same. In practice with the usual types of film, the fact that all drive roller engagements except the first take place between the smooth resilient drive rollers and the wet and therefore lubricated non-emulsion side of the film, allows sufficient creep between the film and rollers to automatically compensate for any expansion or contraction of the film in the baths, so that no looseness or tension develops in the loops. At no point in the process is the wet film under appreciable tension such as occurs in "pull-through" processes and in festoon apparatus employing gravity take-up rollers and the like.

It will be obvious to those skilled in the art that the device is self-threading and requires no leader strips such as are needed in prior processing apparatus for strip film such as movie film. Thus the usually laborious pre-threading of leader strips, attaching them to the film before processing, detaching them afterward, and the undesirable holding of detached trailer strips in the apparatus to serve as leaders for succeeding films, are eliminated, with great saving in complication, time and expense.

In its passage through the fixer-developer bath 18ᵃ, the film 29 induces a circulation of the fluid through the flat channel 27ᵃ in contact with the emulsion side of the film, the flow being in the direction of the film's movement and somewhat slower than the latter. The even application of the fluid in a gently moving flat layer to the moving film's emulsion produces results in the developed and fixed film superior in quality and uniformity to those obtainable either in a still bath (as in ordinary "one-shot" development processes), or in a bath agitated by air bubbles, impellers or the like.

In prior continuous film developing processes, employing separate developing and fixing, very critical control of both time and temperature is necessary to avoid over or under-development, and both these factors are affected by the gradual weakening of the solution.

In the present continuous process, in which the successive steps of developing and fixing are carried out in balanced relation in the same bath, the automatic stopping action of the fixing elements prevents over-development at all times. Thus the speed of the film 29 may be set at a point allowing complete and proper processing until the solution has reached its weakest permissible state, or the speed can be set at any such lower rate as may be made desirable by factors other than development and fixing.

The use of the combined developer and fixer in the present continuous process also eliminates critical temperature control, since this combination, operated in the manner set forth, is effective over a comparatively wide temperature range without appreciable variation.

The foregoing description makes clear that the invention permits continuous processing of strip film such as silver halide movie or microfilm in a consistently proper manner but with minimum attention and skill on the part of the operator, so that excellent results are obtainable even by comparatively inexperienced persons.

In certain cases, if it is desired to operate with special films having a very large percent of expansion or contraction when wet with various solutions, so that the compensating creep, previously set forth, might become appreciably large with the preferred form of apparatus shown in Figures 1 and 2, the device may be supplied with individual drive rollers 63 and 64 on the downward and upward sides of the guide loops, as shown diagrammatically in Figure 5. The succeeding rollers throughout the device may be driven at peripheral speeds successively greater or less in substantial proportion to the increase or decrease in film length due to expansion or contraction between them, the speed differences being provided either by different drive ratios or different roller diameters.

While the apparatus has been illustrated as including three processing baths, the first preferably containing fixer-developer in accordance with the method forming part of the invention, it will be understood that the structure and operative method may advantageously be applied to other developing and treating processes, for which purposes different numbers of baths, film guide loops and related parts may be included, all operable in the manner described. Thus the invention is not limited to the precise structures illustrated, as various changes and modifications may be made therein without departing from the scope of the appended claims.

What is claimed is:

1. In a film processing device, a series of receptacles for containing processing fluids, a supporting frame, guide means comprised of a series of upright and inverted U-shaped members secured to said frame, said members each including a depressed web portion and side rails laterally adjacent thereto and adapted to support and engage only the edge portions of the film, each of said upright members being positioned in a different receptacle, said web portions having apertures formed therein substantially above the tops of said receptacles, and driving means for said film comprised of a series of sets of free and driven rollers extending through said apertures and meeting on a plane substantially in alignment with said side rails to engage said film.

2. A device for processing photographic film including means for continuously moving the film, a chamber including a bath, a fixed guide member immersed in said bath and including oppositely disposed rails for engaging the edges of the film and a web joining said rails and slightly spaced apart from a plane passing through said rails, whereby said film may be passed through said guide member with its emulsion side facing said web, and holes formed in said web, said holes being spaced apart from each other and providing communication between said bath and the space between said web and said emulsion, whereby the motion of the film through said guideway causes fluid from said bath to flow into and out of the space between said web and said emulsion, thereby forming a continuously moving restricted layer of fluid in contact with said emulsion side of the film.

3. A device for processing photographic film including a vessel containing processing fluid, an open-sided channel submerged in said fluid and including rails to be engaged by the edges of the film, and a web integral therewith conjointly forming with the film, when the latter is engaged by said rails with the emulsion side facing said web, a thin restricted passage for fluid, a hole formed in said web and comprising an inlet for fluid, a second hole formed in said web and comprising an exit for fluid, whereby the motion of said film through said guideway effects the formation of a continuously moving thin layer of fluid in contact with said emulsion side.

4. A device according to claim 3 in which a plurality of said receptacles containing different processing fluids is provided and in which guideways are provided in each receptacle with driving means therefor, and in which other guideways interspersed between said first guideways form with the latter a continuous path through said receptacles.

5. In a device for processing strip photographic film, in combination, a plurality of spaced receptacles having walls and forming a series of processing baths, guide means comprised of a series of upright and inverted U-shaped members joined to form a substantially continuous path for said film, said U-shaped members having side portions joined together by a web and including oppositely disposed spaced lips extending toward each other and between which the margins of the film may pass, said web being spaced apart from the surface of the film when its margins are engaged by said lips, driving means including a series of sets of cooperative driven and free rollers, each set being adapted to continuously engage and drive said film at a single position between each upright and each inverted member, said film otherwise forming free loops, a frame supporting said driving means and said guide means and a base for said receptacles normally holding said receptacles in cooperative relation with said guide means and adapted to be bodily lowered to a point below the bottoms of said guide means when it is desired to change said baths, said base carrying means to limit its lowest position with respect to said support and also carrying quickly detachable engaging means for positively securing said base to said support in its normal position.

6. In a device for processing strip film, in combination, an open vessel or tank adapted to contain a processing fluid, a support, a substantially U-shaped guide member secured to said support and normally having a portion thereof submerged in said fluid, said U-shaped guide member including three walls, two of which embrace the margins of the film only and the third of which overlies one face of the film, thereby leaving the other face or emulsion side of the film wide open to the action of said fluid, and means for moving the film through said guide member at a predetermined rate.

7. In a film processing device, in combination, a frame, a series of upright and inverted U-shaped members joined to form a substantially continuous path for said film, said members being mounted in said frame, a series of receptacles, one for each of said upright members, said receptacles being adapted to contain processing fluids, means for propelling said film through said members, a plurality of legs supporting said frame, a supporting base for all said receptacles, means detachably securing said base to said frame, and means for limiting or defining the lowermost position of said base between said legs when said base is detached from said frame, said limiting means also functioning to orient said receptacles with said upright members as said base is raised and normally secured to said frame.

VERNEUR E. PRATT.
DANIEL E. REED.